United States Patent [19]

Efner

[11] Patent Number: 4,737,160

[45] Date of Patent: Apr. 12, 1988

[54] REACTION PRODUCTS OF AMIDO-AMINE AND EPOXIDE USEFUL AS FUEL ADDITIVES

[75] Inventor: Howard F. Efner, Bartlesville, Okla.

[73] Assignee: Phillips Petroleum Company, Bartlesville, Okla.

[21] Appl. No.: 667,675

[22] Filed: Nov. 2, 1984

[51] Int. Cl.[4] .......................... C10L 1/22; C10L 10/04
[52] U.S. Cl. ........................................... 44/66; 44/63; 44/71
[58] Field of Search ............................... 44/66, 63, 71; 260/404.5 PA, 404.5 ED

[56] References Cited

U.S. PATENT DOCUMENTS

| | | | |
|---|---|---|---|
| 2,103,872 | 12/1937 | Schoeller et al. | 260/404.5 PA |
| 3,894,849 | 7/1975 | Polss | 44/66 |
| 4,269,606 | 5/1981 | Bonazza et al. | 44/63 |
| 4,344,771 | 8/1982 | Bonazza et al. | 44/63 |

Primary Examiner—William R. Dixon, Jr.
Assistant Examiner—Jerry D. Johnson
Attorney, Agent, or Firm—A. W. Umphlett

[57] ABSTRACT

Carboxylic acid derived from fatty acid or aralkyl acid is reacted with multiamine, to form a mixture containing amides, imides, and half esters with subsequent reaction with epoxide, particularly an alkylene oxide to produce a product mix that has good detergent properties in fuels.

20 Claims, No Drawings

REACTION PRODUCTS OF AMIDO-AMINE AND EPOXIDE USEFUL AS FUEL ADDITIVES

BACKGROUND OF THE INVENTION

This invention relates to additives for hydrocarbons suitable for use in an internal combustion engine. In one of its aspects this invention relates to detergent additives for hydrocarbon fuels. In another of its aspects this invention relates to fuel detergent additives for use in hydrocarbon fuel in internal combustion engines. In yet another aspect of the invention it relates to mixtures containing a plurality of different functional moieties combining to produce superior qualities for fuel detergents.

The control of induction system deposits in gasoline engines is currently a major concern of the automotive fuel industry. Induction system deposits, especially those formed on valve tulips, can, because of the smaller, more highly loaded automotive engines, lead to loss of power, increased fuel consumption, and greater emissions. In the past, these deposits have been controlled using a fuel detergent in combination with a hydrocarbon oil or other hydrocarbon "carrier fluid." It has now been determined that reaction products of amido-amine and epoxide are suitable as fuel detergents.

It is therefore an object of this invention to provide additive mixtures for internal combustion engine fuels containing multiple detergent functionalities. It is another object of this invention to provide a method for producing detergent additives for internal combustion fuels. It is still another object of this invention to provide a detergent fuel composition combining a fuel detergent additive with a hydrocarbon suitable for use as fuel in an internal combustion engine.

Other aspects, objects and the various advantages of this invention will become apparent upon reading this specification and the appended claims.

STATEMENT OF THE INVENTION

A method is provided for producing a detergent additive for fuels combining multiple detergent functionalities in a product mixture by (1) reacting (a) vegetable oil or (b) higher carboxylic acid having 10–42 carbon atoms with a multiamine to produce a first product mixture that is (2) further reacted with an epoxide. The higher carboxylic acid can be chosen from (i) aliphatic fatty acid having 10–25 carbon atoms and (ii) aralkyl acid having 12–42 carbon atoms.

A product mixture suitable as a detergent additive for fuels is provided which is a composition of matter prepared by reacting an epoxide with a product mixture obtained from the reaction of (a) vegetable oil or (b) higher carboxylic acid having 10–42 carbon atoms with a multiamine. The higher carboxylic acid can be chosen from (i) aliphatic fatty acid having 10–25 carbon atoms and (ii) aralkyl acid having 12–42 carbon atoms.

In a further embodiment of the invention a method is provided for reducing engine deposits in an internal combustion engine comprising the addition of a detergent fuel additive package having as a component a detergent additive which is a composition of matter prepared by reacting an epoxide with a product mixture obtained from the reaction of (a) vegetable oil or (b) higher carboxylic acid having 10–42 carbon atoms with multiamine. The higher carboxylic acid can be chosen from (i) aliphatic fatty acid having 10–25 carbon atoms and (ii) aralkyl acid having 12–42 carbon atoms.

The vegetable oils can be selected from those commonly available such as cottonseed oil, peanut oil, soybean oil, corn oil, rapeseed oil, coconut oil, etc. These are mainly triglycerides of long-chain monocarboxylic acids such as lauric, myristic, stearic, palmitic, palmitoleic, oleic, linoleic, etc., i.e., acids containing 10–25 carbon atoms:

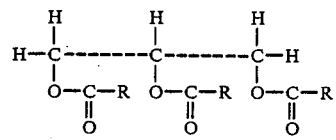

where R is an aliphatic radical of 10–25 carbon atoms.

Generally, vegetable oils contain glycerides of a number of acids, the number and kind varying with the source of vegetable for the oil.

The higher carboxylic acids of the aliphatic fatty acid type can include acids derived from animal or vegetable fats and oils and tall oil acids. A particularly useful and preferred acid mixture for reaction with multiamine is tall oil fatty acid obtained from tall oil. Tall oil is a mixture of rosin and fatty acids released by acidulation of the black liquor soap skimmed off the black liquor from the sulfate process in the manufacture of Kraft paper. Crude tall oil is commonly fractionally distilled to provide various cuts wherein the ratio of fatty acids to rosin acids varies from 1:99 to 99:1. In the context of this description tall oil fatty acid is intended to include tall oil compositions having a fatty acid content of at least about 50% by weight, the balance being mainly rosin acids in admixture with minor amounts of unsaponifiable materials of unknown chemical composition. The fatty acids in tall oil fatty acids consist mainly of oleic, linoleic, conjugated linoleic, palmitic, stearic, palmitoleic, arachidic and behenic acids. Tall oil fatty acids which are commercially available include those having fatty acid content in a range of about 50 to about 98 percent by weight with the total fatty acid content being divided into the following compositions: palmitic (0.1–5.3%); palmitoleic (0–2.1%); stearic (2.1–2.6%); oleic (39.3–49.5%); linoleic (38.1–45.1%); eicosanoic (0–1.9%); eicosadienoic (0–3.2%); eicosatrienoic (0–2.9%); and behenic (0–0.9%) acids, with the balance being rosin acids, unidentified acids and unsaponifiable materials.

Aralkyl acids that are suitable for use to synthesize the additive are those acids that can be prepared by alkylation of an aromatic hydrocarbon such as benzene, toluene, xylenes, or the like with an unsaturated fatty acid such as the mono-unsaturated acids lauroleic, myristoleic, palmitoleic, oleic, gadoleic, and the like, or with poly-unsaturated fatty acids such as linoleic, linolenic, or moroctic acids—$C_{18}$ acids having two, three, and four double bonds, respectively. The aralkyl radical R' of the acids (R'COOH) can contain from about 11-41 carbon atoms; preferably it will contain 17-29 carbon atoms. Examples of suitable aralkyl acids are diphenyllauric acid, triphenylpalmitic acid, phenylstearic acid, and the like in which at least one aromatic radical is combined in the original fatty acid. Particularly preferred is phenylstearic acid.

Among the multiamines that are suitable for use in this invention are those having the general formula $H_2N(CH_2CH_2NH)_xH$ where x is an integer between 1-10, preferably 3-6. Representative multiamines are ethylenediamine (EDA), tetraethylenepentamine (TEPA), pentaethylenehexamine (PEHA), etc. Mixtures of multiamines may be used. Polyethylenimine, among the amines preferred for use in this invention, is representative of a more complex group of multiamines. The preferred multiamine for use in this invention is TEPA.

The amounts of vegetable oil and multiamine employed can be expressed in terms of the molar ratio of triglyceride to nitrogen. Broadly, the ratio is from about 0.05:1 to 1.00:1 and preferably is from about 0.13:1 to about 0.80:1.

The first reaction, which is between the oil and a multiamine, results in a product that is a mixture of glycerol, glycerol partly esterified (mono and diglycerides), and amides and imidazolines of the fatty acids, e.g.,

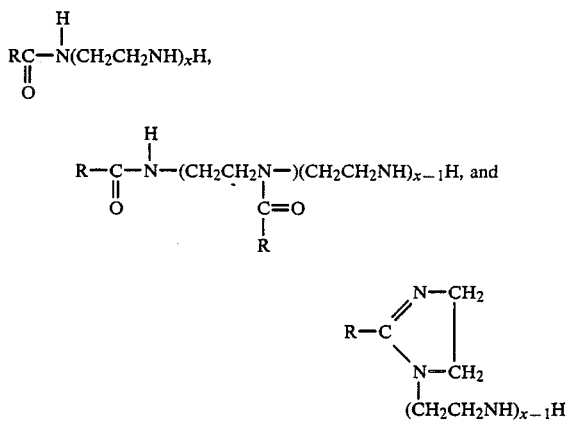

wherein x is as defined above. Reaction conditions for the first reaction are: temperature within the range of about 35° C. to about 260° C., preferably from about 120° C. to about 200° C., for a time of about 1 to about 16 hours, preferably about 4 to about 9 hours which can be carried out at atmospheric pressure or above, but is generally conducted at 15-65 psia when no diluent is present. If a diluent is employed the pressure is usually that produced by the vapor pressure of the diluent at the temperature employed. It is also preferable to utilize an inert atmosphere such as nitrogen over the reaction mixture.

The reaction of multiamine with tall oil acid is carried out by the addition of tall oil acid to multiamine in an amount so that the weight ratios fall within a range of 1:10 to 10:1, preferably 5:1 to 1:5. When the most preferred multiamine, tetraethylenepentamine (TEPA) is used a molar ratio of about 3:1 of tall oil acid to multiamine is used. A reaction temperature in the range of about 125° C. to about 190° C. under a pressure of 0.1 to 1 atm facilitates the removal of water with the reaction terminated when about one mole of water per mole of acid reactant is collected. Sparging the reaction mixture with an inert gas has also been found to be beneficial. The reaction is usually carried out in the absence of solvent.

The ratio in which aralkyl acid and multiamine are combined for reaction is about 0.2-1.0 moles of acid per equivalent of nitrogen. Preferably the ratio is between about 0.4-0.8 moles of acid per equivalent of nitrogen.

Production of amides by reaction between aralkyl acids and multiamines is accompanied by the liberation of water, and is facilitated by the use of temperatures above the normal boiling point of water. Reaction can be effected without using a solvent by operating under conditions in which water vapor is removed from the reactants with the aid of a stream of gas, preferably inert, such as nitrogen or argon. Alternatively the reaction can be effected in a solvent such as a hydrocarbon that permits operation under reflux at a temperature of about 100°-200° C. Since one mole of water is produced per mole of amide, measurement of evolved water provides a convenient method to follow the extent of the reaction.

The reaction of the amido-amine product of the vegetable oil or higher carboxylic acid with multiamine according to this invention can be further reacted with epoxide under conditions of elevated temperature and pressure in the presence of a catalyst containing alkali metal, such as sodium in a compound such as sodium hydroxide or sodium methoxide. The reaction conditions are not critical but usually will fall within a temperature range of about 100° C. to about 175° C. and pressure within the range of about 20 to about 150 psia. The ratio of epoxide to amido-amine is in a range of 1:1 to 100:1, preferably 5:1 to 25:1.

Epoxides useful in the present invention are alkylene oxides such as ethylene oxide, propylene oxide, butylene oxide, styrene oxide, cyclohexene oxide and the like. Ethylene oxide and propylene oxide are preferred.

The final product is quite complex and the distribution of possible reaction products depends upon the ratio of vegetable oil or higher carboxylic acid to multiamine. This product is a detergent additive which is used at about 1-100 pounds/1,000 barrels of fuel to prevent harmful carburetor and intake system deposits. The fuel can be any hydrocarbon useful as an internal combustion engine fuel, preferably hydrocarbon mixtures used in commercial fuel blends.

As noted above, it is usually convenient to handle the detergent additive in a solvent, i.e., a carrier or vehicle, to provide an additive package for use in blending the additive with fuels or lubricant stocks. It is generally considered beneficial to include a minor amount of material which has demulsifier properties in the additive package in the present invention. Such a component, though preferred, is not essential to the deposit inhibiting effect of the additives in the present invention. Any material which is compatible with motor fuels and which exhibits demulsification properties when utilized at relatively low levels such as 0.1-10, preferably 0.5-5, percent by weight based on the weight of the additive in the additive package can be used. Due to the low dosage of such material, it has no tendency to interfere with the deposit-inhibiting effect of the additive or the combustion characteristics of the motor fuel.

Since carburetor detergents possess surfactant properties, fuels containing them often form undesirable emulsions when agitated in the presence of water. The Water Tolerance Test measures the amount of demulsifier which must be added to the additive-fuel blend to break the emulsion. Illustrative of demulsifying agents suitable for use in the present invention, but not limited thereto, are the oxyalkylated alkyl phenol formaldehyde polymers as disclosed in U.S. Pat. Nos. 2,499,367, 3,424,565, and 3,752,657. The most preferred of these is a commercially available product Oronite OGA-473. If needed, the addition of a coupling agent such as isopropyl alcohol in an amount of 5 to about 15 weight percent of the total additive composition can provide a detergent additive package having adequate water tolerance and compatibility.

In the following examples, which should be taken as illustrative and not exclusive, the fuel detergent properties of the additives of the present invention will be made evident by results of various standard tests.

EXAMPLE I

This example illustrates the preparation of compositions comprising the reaction products of soybean oil, tetraethylenepentamine and propylene oxide.

Soybean oil (7947 g, 9 mole) and tetraethylenepentamine (1801 g, 9 mole) were combined in a stirred reactor under a nitrogen atmosphere and heated with stirring at 175° C. for 8 hours. The product was a soybean oil/tetraethylenepentamine (Soya/TEPA) adduct in a molar ratio of 1/1.

The Soya/TEPA adduct (one mole) was placed in a reactor with 0.5 g strong base as catalyst and under a nitrogen atmosphere. The mixture was heated with stirring to 140° C. while propylene oxide was introduced slowly in order to maintain the reaction temperature near 140° C. The temperature (140° C.) and stirring were maintained for a period of time in order to allow complete reaction. The cooled reaction mixture was subsequently withdrawn from the reactor. Table I gives the amount of reactants, the catalyst, and the time period of propylene oxide addition and subsequent heating and stirring.

TABLE I

| Run No. | PO$^a$, mole | Base | Time, Min PO Addn | Subseq. | Soya/TEPA/PO$^b$ |
|---|---|---|---|---|---|
| 1 | 1 | NaOMe$^c$ | 23 | —$^d$ | 1/1/1 |
| 2 | 2 | NaOH$^c$ | 43 | 50 | 1/1/2 |
| 3 | 3 | NaOMe | 79 | 150 | 1/1/3 |
| 4. | 5 | NaOMe | 172 | — | 1/1/5 |
| 5 | 10 | NaOMe | 201 | — | 1/1/10 |

$^a$Propylene oxide.
$^b$Molar ratio of Soya, TEPA, and PO reactants in product.
$^c$NaOMe = sodium methoxide, NaOH = powdered sodium hydroxide.
$^d$(—) denotes time not recorded.

EXAMPLE II

Using the general procedure of Example I (with minor variations in amounts of reactants, times and temperatures) other aralkyl acid or vegetable oil/multiamine/epoxide reaction products were prepared. Table II gives the starting materials and their molar ratios in the final product.

TABLE II

| Run No. | AAA or VO$^a$ | MA$^b$ | AAA or VO/MA/PO$^c$ |
|---|---|---|---|
| 6 | Tall oil$^d$ | EA$^e$ | 3.5/1/11.6 |
| 7 | Soya | EA | 1.16/1/11.6 |
| 8 | Tall oil | TEPA | 3/1/10 |
| 9 | Tall oil | TEPA | 3/1/2 |
| 10 | Tall oil | TEPA | 3/1/5 |
| 11 | Tall oil | ED$^f$ | 1/1/2 |
| 12 | Tall oil | ED | 1/1/5 |
| 13 | Tall oil | DETA$^g$ | 2/1/10 |
| 14 | Tall oil | DETA | 2/1/5 |

$^a$Aralkyl acid or vegetable oil
$^b$Multiamine
$^c$Molar ratio of reactants in products
$^d$From Unitol, ACD special, 98.2% fatty acid from Union Camp Corp.
$^e$E-100, TEPA kettle bottoms from Dow
$^f$Ethylenediamine
$^g$Diethylenetriamine

EXAMPLE III

This example demonstrates the use of a 1/1/10 Soya/TEPA/PO reaction product (see Run 5 in Example I) in a motor fuel additive package and use of that package in a motor fuel composition.

A motor fuel additive package was prepared by intimately mixing the ingredients of Table III.

TABLE III

| Ingredient | Amount, pbw$^a$ |
|---|---|
| Soya/TEPA/PO$^b$ | 40.0 |
| Corrosion inhibitor$^c$ | 3.0 |
| Demulsifier$^d$ | 0.1 |
| Kerosine | 56.9 |

$^a$Parts by weight.
$^b$Product of run 5, Example I.
$^c$Century D-78 from Union Company.
$^d$OGA-473 from Oronite.

The motor fuel additive package was employed in a motor fuel composition in a "Falcon Engine Test" at a loading of either 4 or 10 pounds of package per 1000 barrels of fuel composition.

In the "Falcon Engine Test" a premium base unleaded gasoline without additive as a control and with various additives for test purposes was used to power a 170 CID 6-cylinder Falcon engine. The engine was run for 23 hours at 1800 rpm and 11.4 bhp with continuous, noncyclic operation. About 0.5 cubic feet per minute ambient air was introduced through PCV valve below the carburetor and 3.2 cubic feet per minute of exhaust gas was recirculated unfiltered through the carburetor throttle bore. Intake air was filtered through the standard filter element. An SAE 10W-40 motor oil was used with the oil sump temperature maintained at 216°±4° F. The temperature of coolant out was maintained at 196°±5° F. and the intake air temperature was varied to control the temperature above the carburetor sleeve at 150°±2° F. The fuel flow was maintained at about 1.5 gallons per hour with the air/fuel ratio checked periodically but not controlled and the intake manifold vacuum recorded but not controlled.

The performance of a fuel or additive in this test was evaluated on the basis of deposits formed on a removable aluminum sleeve in the carburetor throat. Three or four differential weights were obtained between the weight of the sleeve at the start of the test and the weights after the test. In this use of the "Falcon Engine Test", the deposits on the removable sleeve were washed with n-heptane and dried prior to weighing. Table IV gives the results of the test using either the additive package described in this example or using a commercial carburetor detergent (Phil-Ad ® CD from Phillips Petroleum Company).

TABLE IV

| Additive | % Reduction[a] | |
|---|---|---|
| | 4 ptb | 10 ptb |
| Inventive | 46 | 68 |
| Commercial | 48 | 63 |

[a]Percent reduction in amount of deposit compared to base fuel without additive package.

Thus the data in Table IV demonstrate the effectiveness of composition of this invention in reducing carburetor deposits. In fact, the inventive composition is comparable to a commercially available carburetor detergent for reducing deposits.

EXAMPLE IV

A 12 L flask was charged with 8032.9 g phenylstearic acid and 1440.2 g tetraethylenepentamine (Dow Chemical Company). The contents were heated with stirring and a nitrogen sparge to 195° C. and the water produced by the reaction was distilled out. 392 ml of 3PS/TEPA was collected. 121.5 g of the product from the first reaction and 0.5 g sodium hydroxide were charged to a 300 ml autoclave. The contents were heated to 130° C. and 29.2 g propylene oxide was added in small portions. After the completion of the propylene oxide addition, the contents were heated to 145°-151° C. for two hours to give the product 3PS/TEPA/5 PO.

I claim:

1. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as fuel in an internal combustion engine, said detergent fuel additive package comprising: (1) a fuel detergent additive that is the reaction product prepared by reacting (a) vegetable oil or (b) higher carboxylic acid chosen from (i) aliphatic fatty acids having 10-25 carbon atoms and (ii) aralkyl acids having 12-42 carbon atoms with (c) multiamine to obtain a first product mixture with said first product mixture reacted with alkylene oxide to produce a second product mixture and (2) a fuel detergent additive solvent compatible with said fuels.

2. A method for reducing engine deposits in an internal combustion engine comprising the addition of a detergent fuel additive package to a hydrocarbon fuel for the engine, said fuel detergent being added to an amount effective to reduce deposits and using said hydrocarbon fuel with fuel detergent additive as a fuel in an internal combustion engine, said detergent fuel additive package prepared by the method comprising: (1) producing a fuel detergent additive by reacting multiamine with (a) vegetable oil or (b) higher carboxylic acid chosen from (i) aliphatic fatty acids having 10-25 carbon atoms and (ii) aralkyl acids having 12-42 carbon atoms to obtain a first product mixture that is further reacted with alkylene oxide to produce a second product mixture and (2) dissolving said second product mixture in a fuel detergent additive solvent compatible with said fuels.

3. A composition of matter comprising (1) a hydrocarbon fuel for an internal combustion engine and a detergent additive composition comprising the reaction product prepared by reacting (a) vegetable oil or (b) higher carboxylic acid chosen from (i) aliphatic fatty acids having 10-25 carbon atoms and (ii) aralkyl acids having 12-42 carbon atoms with (c) multiamine to obtain a first product mixture with said first product mixture further reacted with alkylene oxide to produce a second product mixture.

4. A composition of matter of claim 3 wherein said vegetable oil is selected from among triglycerides of long-chain monocarboxylic acids of the formula

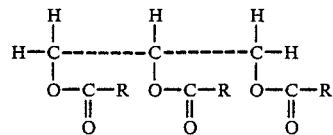

where R is an aliphatic radical of about 10 to about 25 carbon atoms.

5. A composition of matter of claim 3 wherein the reaction product is prepared by reacting multiamine with tall oil acid as the aliphatic fatty acid to form a first product mixture.

6. A composition of matter comprising a detergent additive composition of claim 3 comprising the reaction product prepared by reacting multiamine with aralkyl acid represented by R'COOH wherein R' contains from about 11 to about 41 carbon atoms to form a first product mixture.

7. A composition of matter comprising a detergent additive composition of claim 6 wherein the aralkyl acid is phenylstearic acid; the multiamine is tetraethylenepentamine; and the alkylene oxide is propylene oxide.

8. A composition of matter comprising a hydrocarbon fuel for an internal combustion engine and a fuel detergent additive made by a process comprising (1) producing a fuel detergent additive by reacting multiamine with (a) vegetable oil or (b) higher carboxylic acid chosen from (i) aliphatic fatty acids having 10-25 carbon atoms and (ii) aralkyl acids having 12-42 carbon atoms to obtain a first product mixture that is further reacted with alkylene oxide to produce a second product mixture.

9. A composition of matter comprising a detergent additive composition made by the method of claim 8 wherein said vegetable oil is selected from among triglycerides of long-chain monocarboxylic acids of the formula

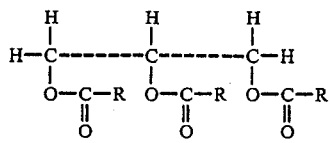

where R is an aliphatic radical of about 10 to about 25 carbon atoms.

10. A composition of matter comprising a detergent additive composition made by the method of claim 8 comprising reacting multiamine with tall oil acid as the aliphatic fatty acid to form a first product mixture.

11. A composition of matter comprising a detergent additive composition made by the method of claim 8 comprising reacting multiamine with aralkyl acid represented by R'COOH wherein R' contains from about 11 to about 41 carbon atoms to form a first product mixture.

12. A composition of matter comprising a detergent additaive composition made by the method of claim 11 wherein the aralkyl acid is phenylstearic acid; the multiamine is tetraethylenepentamine; and the alkylene oxide is propylene oxide.

13. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as fuel in an internal combustion engine, said detergent fuel additive package prepared by the method comprising: (1) a fuel detergent additive that is the reaction product prepared by reacting tall oil acid with multiamine to obtain a first product mixture with said first product mixture further reacted with alkylene oxide to produce a second product mixture and (2) a fuel detergent additive solvent compatible with said fuels.

14. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as a fuel in an internal combustion engine, said detergent fuel additive package prepared by the method comprising: (1) producing a fuel detergent additive by reacting multiamine with tall oil to obtain a first product mixture that is further reacted with alkylene oxide to produce a second product mixture and (2) dissolving said second product mixture in a fuel detergent additive solvent compatible with said fuels.

15. A composition of matter comprising a detergent additive composition comprising: (1) a fuel detergent additive that is the reaction product prepared by reacting tall oil acids having 10-25 carbon atoms and (ii) aralkyl acids having 12-42 carbon atoms with (c) multiamine to obtain a first product mixture with said first product mixture reacted with alkylene oxide to produce a second product mixture and (2) a fuel detergent additive solvent compatible with said fuels wherein the tall oil acid comprises tall oil fatty acids in a range of about 50 to about 98 percent by weight of the total tall oil composition; the multiamine is tetraethylenepentamine; and the alkylene oxide is propylene oxide.

16. A composition of matter comprising a detergent additive composition made by the method of claim 10 wherein the tall oil acid comprises tall oil fatty acids in a range of about 50 to about 98 percent by weight of the total tall oil composition; the multiamine is tetraethylenepentamine; and the alkylene oxide is propylene oxide.

17. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as fuel in an internal combustion engine, said detergent fuel additive package comprising the reaction product prepared by reacting multiamine with aralkyl acid represented by R'COOH wherein R' contains from about 11 to about 41 carbon atoms to obtain a first product mixture with said first product mixture further reacted with alkylene oxide to produce a second product mixture and (2) a fuel detergent additive solvent compatible with said fuels.

18. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as a fuel in an internal combustion engine, said detergent fuel additive package prepared by the method comprising: reacting multiamine with a arylkyl acid represented by R'COOH wherein R' contains from about 11 to about 41 carbon atoms to obtain a first product mixture that is further reacted with alkylene oxide to produce a second product mixture in (2) dissolving said second product mixture in a fuel detergent additive solvent compatible with said fuels.

19. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as fuel in an internal combustion engine, said detergent fuel additive package comprising: (1) a fuel detergent additive that is the reaction product prepared by reacting multiamine with vegetable oil to obtain a first product mixture, said vegetable oil selected from among triglycerides of long-chain monocarboxylic acids of the formula

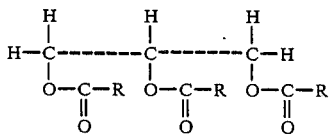

wherein R is an aliphatic radical of about 10 to about 25 carbon atoms to obtain a first product mixture with said first product mixture further reacted with alkylene oxide to produce a second product mixture and (2) a fuel detergent additive solvent compatible with said fuels.

20. A method for reducing engine deposits in an internal combustion engine comprising the addition of a detergent fuel additive package to a hydrocarbon fuel for the engine, said fuel detergent being added in an amount effective to reduce deposits and using said hydrocarbon fuel with fuel detergent additive as a fuel in an internal combustion engine, said detergent fuel additive package produced by the method comprising: (1) producing a fuel detergent additive by reacting multiamine having the general formula $H_2N(CH_2CH_2NH)_xH$ where x is an integer between 1 and 10 with vegetable oil selected from among triglycerides of long-chain monocarboxylic acids of the formula

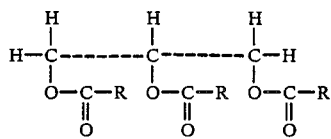

where R is an aliphatic radical of about 10 to about 25 carbon atoms to obtain a first product mixture that is further reacted with alkylene oxide to product a second product mixture and (2) dissolving said second product mixture in a fuel detergent additive solvent compatible with said fuels.

* * * * *